United States Patent [19]

Garwin

[11] Patent Number: 5,246,717
[45] Date of Patent: Sep. 21, 1993

[54] EGGS COMPATIBLE WITH CHOLESTEROL-REDUCING DIET AND METHOD OF PRODUCING THE SAME

[75] Inventor: Jeffrey L. Garwin, Paoli, Pa.

[73] Assignee: C. R. Eggs Inc., King of Prussia, Pa.

[21] Appl. No.: 785,976

[22] Filed: Oct. 31, 1991

[51] Int. Cl.$^5$ .............................. A23K 1/00
[52] U.S. Cl. ........................... 426/2; 426/74; 426/614; 426/805
[58] Field of Search ............... 426/2, 614, 805, 74

[56] References Cited

U.S. PATENT DOCUMENTS

| | | | |
|---|---|---|---|
| 3,657,423 | 4/1972 | Yacowitz | 424/127 |
| 4,128,640 | 12/1978 | Klein | 426/2 |
| 4,187,294 | 2/1980 | Ishikawa et al. | 424/669 |
| 4,197,293 | 4/1980 | Klein | 424/669 |
| 4,197,294 | 4/1980 | Klein | 426/2 |
| 4,394,376 | 7/1983 | Kamimae et al. | 424/669 |
| 4,410,541 | 10/1983 | Kamimae et al. | 514/400 |
| 4,738,853 | 4/1988 | Horrobin | 426/807 |
| 5,012,761 | 5/1991 | Oh | 426/2 |

FOREIGN PATENT DOCUMENTS 143566 12/1978 Japan.
115159 7/1982 Japan.

OTHER PUBLICATIONS

Garber, D.W., et al., "Plasma Lipoproteins In Hyperlipidemic Subjects Eating Iodine-Enriched Eggs", *Journal of the American College of Nutrition*, vol. 11, No. 3, pp. 294–303 (1992).
Serfontein et al., *Am. J. Clin. Pathol.*, 1979, 604–606 (1983).
Brown et al., *J. Am. Diet. Assoc.*, 46, 189–192 (1965).

*Primary Examiner*—R. B. Penland
*Attorney, Agent, or Firm*—Seidel, Gonda, Lavorgna & Monaco

[57] ABSTRACT

Chicken eggs are provided which contain controlled amounts of vitamin E and iodine. No more than about 34% of the fatty acid content of the eggs comprises saturated fatty acid. The eggs may be eaten in the context of a standard low fat diet, without increasing the dieter's serum cholesterol concentration. The eggs are produced by maintaining egg laying chickens on a diet free of animal fat, wherein conventional feed is supplemented with controlled amounts of unsaturated fatty acid, iodine and vitamin E.

19 Claims, No Drawings

EGGS COMPATIBLE WITH CHOLESTEROL-REDUCING DIET AND METHOD OF PRODUCING THE SAME

FIELD OF THE INVENTION

The invention relates to eggs which are compatible with diets used to treat hypercholesterolemia, and a method of feeding chickens for the production of such eggs. The egg yolk is simultaneously enriched in vitamin E and iodine, while the saturated fat content is reduced.

BACKGROUND OF THE INVENTION

Eggs are generally known to be a nutrient-rich, highly digestible food. Recently, concerns over the high incidence of heart disease in developed countries have led to the identification of risk factors that may be controlled to reduce the incidence of heart disease. One such risk factor is hypercholesterolemia, i.e., high blood cholesterol. In the United States, the Government and the American Heart Association, as well as the majority of experts, have identified dietary cholesterol as a significant contributor to hypercholesterolemia and cardiovascular disease. As a result, it is generally recommended that cholesterol intake should be limited to less than 300 mg per day. Since egg yolks typically contain 213 mg of cholesterol, diets most commonly recommended for hypercholesterolemic patients restrict total egg yolk consumption, including eggs used in baked goods and pasta, to four or fewer egg yolks per week.

Generic chicken eggs typically contain, on average, 25 $\mu$g of iodine per whole egg and 0.7 mg of vitamin E. The product of the iodine and vitamin E content is thus 17.5 $\mu$g-mg. In addition, saturated fatty acid comprises approximately 37-38% of the fatty acid content of generic eggs.

U.S. Pat. No. 4,187,294 teaches increasing the amount of iodinated amino acids in eggs by feeding hens an increased amount of calcium iodate, in excess of 230 $\mu$g/kg of feed. This causes iodinated amino acids to accumulate in the eggs at a level of 7 parts per million (ppm) or more. The eggs are alleged to be effective in preventing and curing hypercholesterolemia.

U.S. Pat. No. 4,394,376 discloses feeding hens an iodine compound and/or seaweed such that the feed iodine content is increased to 50-2,500 ppm. The eggs obtained have an iodine content of 300-4,000 $\mu$g per egg, compared with 6-30 $\mu$g for conventional eggs. It is alleged that ingestion of the eggs reduces serum triglycerides. Canadian Patent 1,115,983 contains a similar teaching.

U.S. Pat. No. 4,410,541 discloses increasing the monoiodohistidine content of fowl eggs by feeding birds an iodine compound or seaweed. Ingestion of the eggs is alleged to lead to heightened high-density lipoprotein in the blood, decreased plasma triglyceride, heightened lipoprotein lipase activity, and decreased blood cholesterol. The eggs contain 250-3,500 $\mu$g monoiodohistidine, per egg.

U.S. Pat. Nos. 4,197,293, 4,197,294 and 4,128,640 describe a reduced cholesterol egg obtained by feeding poultry a mixture of vegetable materials containing a specified amount of iodine, niacin, hormones and trace amounts of calcium and magnesium.

U.S. Pat. No. 5,012,761 teaches feeding chickens a composition including fish oil, which results in production of eggs containing substantial quantities of $\omega$3-polyunsaturated fatty acids. The modified eggs, when fed to humans, allegedly result in reduction of serum cholesterol, serum triglycerides and blood pressure.

U.S. Pat. No. 4,738,853 teaches feeding hens or other domesticated birds a supplement containing $\gamma$-linolenic acid, or higher acids in the n-6 series to reduce egg cholesterol content and increase polyunsaturated fatty acid content. U.S. Pat. No. 4,868,001 discloses an animal feed containing heat-treated $\omega$6-unsaturated fatty acids, such as $\gamma$-linolenic acid, to improve feed efficiency and animal health.

U.S. Pat. No. 3,657,423 discloses a chicken feed composition containing fly ash for achieving weight gain. The feed also contains various vitamins and trace minerals, including vitamin E and iodine.

While amounts of iodine and fatty acid have been separately varied in egg production, eggs have not been produced wherein the saturated fatty acid, iodine and vitamin E content are controlled to result in a product which is compatible with a lowfat diet. What is needed is an egg which is compatible with low fat diets designed for hypercholesterolemic patients, which may be consumed in substantial quantities without resulting in an increase in the blood cholesterol level of such patients.

SUMMARY OF THE INVENTION

According to the present invention, a chicken egg is provided having a fatty acid content which comprises no more than 34 wt. % saturated fatty acid, the balance of the fatty acids comprising unsaturated fatty acids.

The egg is also characterized by a vitamin E content of from about 3 to about 12 mg, preferably from about 4 to about 9 mg, most preferably from about 5 to about 9 mg. The egg is further characterized by an iodine content of from about 40 to about 112 $\mu$g, preferably from about 50 to about 100 $\mu$g, most preferably from about 50 to about 85 $\mu$g. The aforementioned amounts of vitamin E and iodine are based upon a whole shell egg weight of 59 g, or alternatively, a liquid weight of 50 g. The composition of the egg is further constrained such that the multiplicative product of the amount of iodine, in $\mu$g, and the amount of vitamin E in mg, is in the range of from about 120 to about 1200 $\mu$g-mg, preferably from about 200 to about 800 $\mu$g-I.U., most preferably from about 250 to about 800 $\mu$g-I.U.

The invention is also a liquid egg modified to contain the same amounts of iodine and vitamin E, per 50 g of liquid egg, and the same proportion of saturated fatty acid to total fatty acid content, as defined for the whole shell egg. By "liquid egg" is meant the liquid content of an egg, that is, the whole shell egg minus the shell.

Alternatively, since fatty acid, vitamin E and iodine accumulate preferentially in the egg yolk as opposed to the egg white, the invention is also an improved egg yolk containing, per 16.6 g of yolk, the same amounts of iodine and vitamin E, and the same proportion of saturated fatty acid to total fatty acid content, as defined for the whole shell egg, above.

The invention further comprises a method of feeding chickens. Chickens are fed a diet substantially free of animal fat. The diet is supplemented with vitamin E, iodine and unsaturated fatty acid in amounts such that the eggs so produced contain fatty acid which is no more than 34% saturated, and such that the eggs contain the targeted amounts of iodine and vitamin E.

Accordingly, a method for providing chicken eggs compatible with a low fat diet comprises feeding chickens a feed substantially free of animal fat, supplemented with from about 0.5 to about 5 wt. %, preferably from about 1 to about 2 wt. %, of edible oil containing more than 82 wt. % unsaturated fatty acids. The feed is further supplemented with iodine and vitamin E such that the iodine content of the feed is from about 2.5 to about 7 mg/kg of feed, more preferably from about 2.7 mg/kg to about 6 mg/kg of feed, and the vitamin E content of the feed is from about 100 to about 300 mg/kg of feed.

DETAILED DESCRIPTION OF THE INVENTION

The feed of laying hens is modified to obtain eggs which are more compatible with standard diets designed to reduce serum cholesterol. Through extensive clinical testing of human subjects, it has been demonstrated that up to twelve of the inventive eggs may be consumed in the context of a low-fat diet, without a significant increase in serum cholesterol, as compared to subjects consuming no eggs per week. This result is surprising, since the level of egg consumption is three times the level permitted by the most commonly recommended low-fat diets. The present invention provides eggs which may be enjoyed regularly by hypercholesterolemic patients on low-fat diets, without increasing serum cholesterol.

According to the present invention, laying hens are fed a conventional feed, such as a grain-based feed primarily of corn, soybean or milo. Substantially all animal by-products are withheld, since such by-products contain animal fat, which is rich in saturated fatty acid. The diet contains reduced amounts of saturated fatty acid in favor of unsaturated fatty acids, resulting in an egg wherein the amount of unsaturated fat is increased at the expense of saturated fat.

Chicken eggs are relatively high in fat. Approximately 33% of the egg dry weight is fatty acid, of which 38% thereof are saturated fatty acids. The fatty acid content of the eggs of the present invention comprises no more than 34% saturated fatty acid, preferably not more than about 33%, which represents an about 10% reduction in saturation over conventional eggs. The adjustment in saturated fatty acid content of the egg is achieved by supplementing the chicken feed with edible oil containing at least 82 wt. % unsaturated fatty acids, and by withholding substantially all animal fat. Edible oils containing at least 82 wt. % unsaturated fatty acids include, for example, soy oil, corn oil, canola oil, and other vegetable oils. Canola oil is particularly preferred because it contains only 6.4 wt. % saturated fatty acids. Corn oil is somewhat higher in saturated fat, containing 12.7 wt. % saturated fatty acid. Soy oil contains 14.2 wt. % saturated fatty acids. The chicken feed may advantageously comprise about 0.5 to about 5 wt. %, more preferably from about 1 to about 2 wt. %, of such added edible oils in order to achieve production of eggs containing fatty acids no more than 34% of which comprise saturated fatty acids.

Substantially all of the fatty acids contained in these edible oils are esterified to glycerol, thus forming triglycerides. Accordingly, the term "fatty acid", in connection with the composition of such edible oils, is meant to include not only free fatty acid in the sense of long chain carboxylic acids, but also glycerol esters of such free fatty acids, most notably triglycerides thereof.

The amount of unsaturated fatty acid added to the diet is selected such that the total metabolizable energy content of the feed preferably approximates at least about 1280 ME kcal per pound of feed. The National Research Council has determined that this is an appropriate feed energy content required for proper nutrition in egg-laying chickens. The metabolizable energy content of the principal components of any chicken feed may be determined from standard nutritional tables which are well known to those skilled in the art of poultry farming, such as *Nutrient Requirements of Poultry*, (8th ed., 1984), published by the Subcommittee on Poultry Nutrition, Committee on Animal Nutrition, Board on Agriculture, National Research Council.

The added unsaturated fatty acid may be viewed as an energy replacement for the animal fat which is withheld from the diet. Where the feed is naturally high in unsaturated oil, such as, for example, a corn-based feed, only a small amount of added unsaturated fatty acid need be incorporated into the chicken diet. Where the feed is otherwise low in vegetable fat content, a larger amount of unsaturated fatty acid will be added to the feed to compensate for the elimination of all animal fat from the diet. For most grain-based feeds, the addition of from about 0.5 to about 5 wt. % will be sufficient, more typically, from about 1 to about 2 wt %, based upon the total feed weight.

The increased tendency toward oxidation in the unsaturated fat-enriched chicken feed, and in the resulting unsaturated fat-enriched eggs, is compensated by substantially increasing the vitamin E content of the feed, which also increases the vitamin E content of the egg. Vitamin E is an anti-oxidant. While typical chicken feeds contain 10-25 mg vitamin E per kg of feed, the amount of vitamin E in the feed is increased in accordance with the present invention to a level of from about 100 to about 300 mg, per kg of feed. This feed vitamin E level may be obtained by increasing the proportion of vitamin E-rich materials in the feed. The common feed ingredient naturally richest in vitamin E is dehydrated alfalfa meal, which contains approximately 147 mg/kg of the vitamin. Alternatively, the feed may be supplemented with the equivalent in pure vitamin E. A combination of pure vitamin E and vitamin E food source may be utilized to increase the feed vitamin E content.

In order to achieve a targeted egg iodine content of 40-112 μg per whole shell egg or yolk, the iodine content of the feed is increased by any of the various methods heretofore known for enhancing egg iodine content. Thus, the chicken feed may be advantageously supplemented with an iodine compound and/or high iodine content vegetable material, such as seaweed. Iodine compounds useful for this purpose comprise, for example, calcium iodide, potassium iodide, sodium iodide, cuprous iodide, thymol iodide, and ethylenediamine dihydroiodide (EDDI). Of these compounds, potassium iodide and EDDI are preferred. Examples of seaweed containing appreciable amounts of iodine are sea tangle and kelp.

It has been demonstrated by clinical research that approximately ten percent of the population suffers from varying degrees of iodine deficiency. Ingesting two eggs of the present invention daily will supply the recommended daily allowance of iodine, 150 μg, but will not increase serum cholesterol when taken in the context of a standard low-fat diet. Two eggs per day will also supply a substantial portion of the recommended daily allowance of vitamin E, which is 30 I.U.

It is known that when laying hens are fed a conventional feed containing up to 2 mg/kg of iodine, the resulting eggs contain 6-30 μg iodine. In order to achieve an egg iodine level in the range of about 40 to 112 μg, the feed level of iodine is in the range of from about 2.5 to about 7 mg/kg, more preferably from about 2 to about 6 mg/kg. It may be appreciated that this is significantly less iodine than taught, for example, in U.S. Pat. No. 4,394,376, which discloses a feed iodine content of 50-2,500 mg/kg to obtain an egg iodine level of 300-4,000 μg. It has been surprisingly found that an iodine level of only 40-112 μg is sufficient to provide an egg that is compatible with a low fat diet, even when as many as twelve such eggs are consumed per week. The iodine source in the feed most advantageously comprises potassium iodide, EDDI, kelp, or combination thereof.

Sufficient time should be allowed between the initiation of the chicken feed diet and utilization of the resulting eggs, so as to allow the desired adjustments in the egg fatty acid content, iodine and vitamin E to occur in the egg production. The chickens should be maintained on the diet of the present invention for at least about 3 weeks, more preferably at least about 4 weeks, before the first eggs are taken.

The eggs of the present invention may be effectively utilized in restricted fat diets in natural, non-processed form, or after processing such as drying, concentrating, powdering or granulating. The shelled egg may be consumed whole, or the yolk may be extracted and separately consumed. Consumption of two inventive eggs per day will be sufficient to provide the recommended daily allowance of iodine (150 μg/day), but will not exceed the presently legislated daily limit of iodine consumption from single food sources (225 μg/day). See 21 Code of Federal Regulations 172.365 and 172.375.

Consumption of the inventive eggs on a daily basis in the context of a low-fat diet does not result in an increase in serum cholesterol, as compared to individuals on a matched low-fat diet without eggs. It is expected from the state of the art, that ingestion of two eggs per day would increase serum cholesterol by 23 μg/dl. Surprisingly, we have found only a 5 μg/dl increase when two of the inventive eggs are ingested daily in the context of a low-fat diet. The 5 μg/dl serum cholesterol increase is not believed to be statistically significant. This result is further surprising since it has been found in a previous study that administration of oral vitamin E results in an increase of both LDL-cholesterol, and an unfavorable shift in both LDL-cholesterol/HDL-cholesterol and $HDL_2$-cholesterol/$HDL_3$-cholesterol ratios (Serfontein et al. Am. J. Clin. Pathol., 79, 604-606 (1983)). The authors of the study concluded that there is no reason to believe that vitamin E has a role in the treatment or prevention of coronary heart disease.

The present results are further unexpected in view of yet another study indicating that consumption of two eggs a day completely reversed the benefits of a diet that otherwise reduced serum cholesterol (Brown et al., J. Am. Diet. Assoc., 46, 189-192 (1965)). The authors also noted that consumption of modified eggs rich in polyunsaturated fat was ineffective in reducing serum cholesterol of individuals consuming a diet otherwise low in cholesterol. These results lead Brown et al to conclude that eggs with increased amounts of polyunsaturated fatty acids had no advantage over ordinary eggs in regulating cholesterol.

The present invention has been described with resort to increasing the unsaturated fat, iodine and vitamin E content of eggs through adjustments in chicken diet. However, the herein disclosure should not be interpreted as to exclude other methods, such as direct addition to liquid egg of vitamin E and appropriate iodine compounds, and direct exchange of fats in liquid egg yolks or whole egg products.

The practice of the present invention is illustrated by the following nonlimiting examples.

EXAMPLE 1

A group of Babcock laying hens was fed a diet containing no animal fat, 1.6 ppm iodine from kelp, approximately 1 ppm iodine from potassium iodide, 1 wt. % canola oil, and 200 I.U./kg of vitamin E. The feed composition was as follows. The metabolizable energy content was about 1290 Kcal/lb.

| Ingredient | Wt. % |
| --- | --- |
| Purina Biotene[1] | 1.250 |
| Cromophyl L-7[2] | 0.315 |
| kelp[3] | 0.032 |
| alfalfa | 0.365 |
| corn meal | 64.95 |
| soybean meal (48.5% protein) | 21.40 |
| limestone | 8.36 |
| dicalcium phosphate | 1.50 |
| D,L-methionine | 0.06 |
| salt | 0.33 |
| vitamin mix[4] | 0.25 |
| mineral mix[5] | 0.15 |
| canola oil | 1.0 |

[1]Biotene mixture containing added Vitamin $B_6$, and Vitamin E and rice bran.
[2]Lynteq, Inc.; to provide yolk color >9 on the Roche Scale.
[3]High iodine kelp (≈5000 ppm total iodide).
[4]Vitamin mix provides the following per kilogram of diet: vitamin A, 8800 I.U.; vitamin $D_3$, 2200 ICU; vitamin E, 11 I.U.; menadione sodium bisulfite, 2.2 mg; riboflavin, 4.4 mg; pantothenic acid, 8.8 mg; niacin, 44 mg; vitamin $B_6$, 2.2 mg, folic acid, 0.55 mg; biotin, 110 μg; thiamine, 2.2 mg; vitamin $B_{12}$, 6.6 μg; choline 220 mg; ethoxyquin, 125 mg.
[5]Mineral mix provides the following per kilogram of diet: Mn, 60 mg; Zn, 50 mg; Fe, 30 mg; Cu, 5 mg; I, 1.06 mg; Se, 0.1 mg.

After approximately three weeks, and for approximately the next three months, whole eggs weighing 59 g from these hens averaged 68 μg iodine, 10 mg vitamin E and fatty acid which was 32.5% saturated fatty acids. When 48 hypercholesterolemic human subjects consumed 12 of these eggs per week for six weeks in the context of a low fat diet, both total serum cholesterol and LDL cholesterol declined significantly, with a p value of less than 0.0002 for both declines. Neither of these changes was significantly different from a group of fifty matched hypercholesterolemic subjects maintained on a low fat diet containing no whole shell eggs. HDL cholesterol declined significantly in both groups. The difference in decline was not statistically different between the two groups.

EXAMPLE 2

DeKalb hens were fed a feed containing 185 ppm vitamin E, 2.7 ppm iodine from kelp, 1.2 ppm iodine from $CaIO_3$ and 1 wt. % canola oil. The eggs obtained contained, on average, 5.8 mg vitamin E and 50 μg iodine, per 59 g of whole shell egg weight. The saturated fatty acid content, as a percentage of total fatty acid in the egg, was 32.4 wt. %. The feed contained the following macro ingredients per 2000 lbs, approximately:

| | |
|---|---|
| 1330 lbs | chop corn |
| 275 lbs | soybean meal 48% protein |
| 160 lbs | limestone |
| 65 lbs | corn gluten meal |
| 50 lbs | calcium chips |
| 50 lbs | canola meal (fat extracted) |
| 25 lbs | dicalcium phosphate (18.5% phosphate) |
| 20 lbs | canola oil |
| 18 lbs | of a blend containing 300 ppm iodine from kelp, 20,000 I.U./kg vitamin E, 30 mg/kg riboflavin, 1200 mg/kg pyridoxine-HCl, 60% rice bran, and the remainder dehydrated alfalfa meal |

EXAMPLE 3

ISA hens received a feed resulting in the production of eggs containing, on average, 7.3 mg vitamin E and 64 µg iodine, per 59 g of whole shell egg weight. The egg saturated fatty acid content, as a percentage of total fatty acid, was 33.0 wt %. The feed contained 185 ppm vitamin E, 2.7 ppm iodine from kelp, 1.2 ppm iodine from $CaIO_3$, and 1 wt. % vegetable oil. The metabolizable energy content was about 1280 kcal/lb. The feed contained the following macro ingredients per 2000 lbs, approximately:

| | |
|---|---|
| 1125 lbs | coarse corn meal |
| 275 lbs | soy meal |
| 110 lbs | corn gluten (60% protein) |
| 45 lbs | corn gluten (21% protein) |
| 100 lbs | distillers grains |
| 100 lbs | wheat middlings |
| 90 lbs | limestone |
| 80 lbs | calcite crystals |
| 25 lbs | dicalcium phosphate 18.5% |
| 21 lbs | vegetable oil[1] |
| 18 lbs | blend containing 300 ppm iodine from kelp, 20,000 I.U./kg vitamin E, 30 mg/kg riboflavin, 1200 mg/kg pyridoxine-HCl, 60% rice bran, and the remainder dehydrated alfalfa meal. |

[1]Colfax Feed Oil #2: Approximately 50% soy oil and 50% canola oil

EXAMPLE 4

Another group of ISA hens were fed a diet including 245 ppm vitamin E, 3.6 ppm iodine from kelp, 1.2 ppm iodine from $CaIO_3$, and 0.5 wt. % vegetable oil. The metabolizable energy content of the feed was about 1280 kcal/lb. The eggs collected averaged 7.8 mg vitamin E, and 68 µg of iodine, per whole shell egg weight of 59 g. The saturated fatty acid content of the eggs, as a percentage of totally fatty acid, was 33.3 wt. %. The feed contained the following macro ingredients per 2,000 lbs, approximately:

| | |
|---|---|
| 1200 lbs | coarse corn meal |
| 250 lbs | soy meal |
| 120 lbs | corn gluten (60% protein) |
| 20 lbs | corn gluten (21% protein) |
| 40 lbs | distillers grains |
| 120 lbs | wheat middlings |
| 100 lbs | limestone |
| 80 lbs | calcite crystals |
| 25 lbs | dicalcium phosphate (18.5% phosphate) |
| 9 lbs | Colfax Feed Oil #2[1] |
| 24 lbs | of a blend containing 300 ppm iodine from kelp, 20,000 I.U./kg vitamin E, 30 mg/kg riboflavin, 1200 mg/kg pyridoxine-HCl, 60% rice bran, and the remainder dehydrated alfalfa meal. |

[1]Approximately 50% soy oil and 50% canola oil.

The present invention may be embodied in other specific forms without departing from the spirit or essential attributes thereof and, accordingly, reference should be made to the appended claims, rather than to the foregoing specification, as indicating the scope of the invention.

I claim:

1. A chicken egg comprising:
   (a) from about 3 to about 12 mg vitamin E, per 59 g of whole shell egg, and
   (b) from about 40 to about 112 µg of iodine, per 59 g of whole shell egg,
   wherein the multiplicative product of the amount of iodine in µg and the amount of vitamin E in mg, per 59 g of whole shell egg, is from about 120 to about 1,200 µg-mg, and wherein no more than about 34% of the egg's fatty acid content is comprised of saturated fatty acid.

2. A chicken egg according to claim 1,
   wherein the egg comprises from about 4 to about 9 mg vitamin E, per 59 g of whole shell egg, and from about 50 to about 100 µg of iodine, per 59 g of whole shell egg, and
   wherein the multiplicative product of the amount of iodine in µg and the amount of vitamin E in mg, per 59 g of whole shell egg, is from about 200 to about 800 µg-mg.

3. A chicken egg according to claim 2,
   wherein the egg comprises from about 5 to about 9 mg vitamin E, per 59 g of whole shell egg, and from about 50 to about 85 µg of iodine, per 59 g of whole shell egg, and
   wherein the multiplicative product of the amount of iodine in µg and the amount of vitamin E in mg, per 59 g of whole shell egg, is from about 250 to about 800 µg-mg.

4. A chicken egg according to claim 3 containing about 6 mg vitamin E and about 65 µg iodine, per 59 g of whole shell egg.

5. A liquid chicken egg comprising:
   (a) from about 3 to about 12 mg vitamin E, per 50 g of liquid egg, and
   (b) from about 40 to about 112 µg of iodine, per 50 g of liquid egg,
   wherein the multiplicative product of the amount of iodine in µg and the amount of vitamin E in mg, per 50 g of liquid egg, is from about 120 to about 1,200 µg-mg, and wherein no more than about 34% of the egg's fatty acid content is comprised of saturated fatty acid.

6. A liquid egg according to claim 5,
   wherein the egg comprises from about 4 to about 9 mg vitamin E, per 50 g of liquid egg, and from about 50 to about 100 µg of iodine, per 50 g of liquid egg, and
   wherein the multiplicative product of the amount of iodine in µg and the amount of vitamin E in mg, per 50 g of liquid egg, is from about 200 to about 800 µg-mg.

7. A liquid egg according to claim 6,
   wherein the egg comprises from about 5 to about 9 mg vitamin E, per 50 g of liquid egg, and from about 50 to about 85 μg of iodine, per 50 g of liquid egg, and wherein the multiplicative product of the amount of iodine in μg and the amount of vitamin E in mg, per 50 g of liquid egg, is from about 250 to about 800 μg-mg.

8. A liquid egg according to claim 7 containing about 6 mg vitamin E and about 65 μg of iodine, per 50 g of liquid egg.

9. A chicken egg yolk comprising:
(a) from about 3 to about 12 mg vitamin E, per 16.6 g of yolk, and
(b) from about 40 to about 112 μg of iodine, per 16.6 g of yolk, wherein the multiplicative product of the amount of iodine in μg and the amount of vitamin E in mg, per 16.6 g of yolk, is from about 120 to about 1,200 μg-mg, and wherein no more than about 34% of the yolk's fatty acid content is comprised of saturated fatty acid.

10. A yolk according to claim 9,
wherein the yolk comprises from about 4 to about 9 mg vitamin E, per 16.6 g of yolk, and from about 50 to about 100 μg of iodine, per 16.6 g of yolk, and
wherein the multiplicative product of the amount of iodine in μg and the amount of vitamin E in mg, per 16.6 g of yolk, is from about 200 to about 800 μg-mg.

11. A yolk according to claim 10,
wherein the yolk comprises from about 5 to about 9 mg vitamin E, per 16.6 g of yolk, and from about 50 to about 100 μg of iodine, per 16.6 g of yolk, and
wherein the multiplicative product of the amount of iodine in μg and the amount of vitamin E in mg, per 16.6 g of yolk, is from about 250 to about 800 μg-mg.

12. A yolk according to claim 11 containing about 6 mg of vitamin E and about 65 μg of iodine, per 16.6 g of yolk.

13. A method for providing chicken eggs compatible with a low-fat human diet comprising:
(a) feeding chickens a feed substantially free of animal fat and supplemented with vitamin E, iodine and unsaturated fatty acid in amounts such that the eggs so produced
  (i) have a fatty acid content which comprises no more than about 34% saturated fatty acid;
  (ii) contain from about 3 to about 12 mg vitamin E, per 59 g of whole shell egg;
  (iii) contain from about 40 to about 120 μg of iodine, per 59 g of whole shell egg; and
  (iv) have a multiplicative product of the amount of iodine in μg and the amount of vitamin E in mg, per 59 g of whole shell egg, which ranges from about 120 to about 1,200 μg-mg; and
(b) collecting the eggs so produced.

14. A method according to claim 13,
wherein the eggs so produced comprise, per 59 g of whole shell egg, from about 4 to about 9 mg vitamin E and from about 50 to about 100 μg of iodine, and
wherein the multiplicative product of the amount of iodine in μg and the amount of vitamin E in mg, per 59 g of whole shell egg, is from about 200 to about 800 μg-mg.

15. A method according to claim 14,
wherein the eggs so produced comprise, per 59 g of whole shell egg, from about 5 to about 9 mg vitamin E and from about 50 to about 85 μg of iodine, and
wherein the multiplicative product of the amount of iodine in μg and the amount of vitamin E in mg, per 59 g of whole shell egg, is from about 250 to about 800 μg-mg.

16. A method for providing chicken eggs compatible with a low fat diet comprising:
(a) feeding chickens a feed substantially free of animal fat, supplemented with from about 0.5 to about 5 wt. % edible oil containing at least 82 wt. % unsaturated fatty acid, and further supplemented with iodine and vitamin E such that the iodine content of the feed is from about 2.5 to about 7 mg per kg of feed, and the vitamin E content of the feed is from about 100 to about 300 mg per kg of feed, and
(b) collecting the chicken eggs produced by the chickens so fed.

17. A method according to claim 16 wherein the feed is supplemented with from about 1 to about 2 wt. % edible oil containing at least 82 wt % unsaturated fatty acid.

18. A method according to claim 16 wherein the iodine supplement comprises seaweed, potassium iodide, ethylenediamine dihydroiodide, or combinations thereof.

19. A method according to claim 16 wherein the edible oil comprises soy oil, corn oil, canola oil, or combinations thereof.

* * * * *